(12) United States Patent
Ren et al.

(10) Patent No.: US 12,199,898 B2
(45) Date of Patent: Jan. 14, 2025

(54) DATA TRANSMISSION METHOD AND DEVICE

(71) Applicant: DATANG MOBILE COMMUNICATIONS EQUIPMENT CO., LTD., Beijing (CN)

(72) Inventors: Bin Ren, Beijing (CN); Yanping Xing, Beijing (CN); Xiangli Lin, Beijing (CN); Zheng Zhao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 666 days.

(21) Appl. No.: 17/311,691

(22) PCT Filed: Sep. 19, 2019

(86) PCT No.: PCT/CN2019/106812
§ 371 (c)(1),
(2) Date: Jun. 8, 2021

(87) PCT Pub. No.: WO2020/119207
PCT Pub. Date: Jun. 18, 2020

(65) Prior Publication Data
US 2022/0029762 A1 Jan. 27, 2022
US 2023/0155759 A9 May 18, 2023

(30) Foreign Application Priority Data
Dec. 14, 2018 (CN) .......................... 201811535526.4

(51) Int. Cl.
*H04L 5/00* (2006.01)
*H04J 13/00* (2011.01)
*H04L 27/26* (2006.01)

(52) U.S. Cl.
CPC ........ *H04L 5/0048* (2013.01); *H04J 13/0062* (2013.01); *H04L 27/26035* (2021.01)

(58) Field of Classification Search
CPC ............. H04L 5/0048; H04L 27/26035; H04L 27/2613; H04L 5/0051; H04L 5/0044; H04L 5/0007; H04J 13/0062
See application file for complete search history.

(56) References Cited

FOREIGN PATENT DOCUMENTS

| CN | 102082595 A | 6/2011 |
| CN | 102158319 A | 8/2011 |

(Continued)

OTHER PUBLICATIONS

3GPP TR 38.812 V0.4.0, 3rd Generation Partnership Project; Technical Specification Group Radio Access Network; Study on Non-Orthogonal Multiple Access (NOMA) for NR; (Release 16) total 123 pages, Nov. 2018.

(Continued)

*Primary Examiner* — Mandish K Randhawa
(74) *Attorney, Agent, or Firm* — Kilpatrick Townsend & Stockton LLP

(57) ABSTRACT

The present application describes a data transmission method and device, which are used to better support non-orthogonal multiple access data transmission in an uplink grant-free scenario. The data transmission method includes determining a demodulation reference signal (DMRS) orthogonal port pattern of an uplink data channel, there being more than 12 DMRS orthogonal ports; and using the DMRS orthogonal port pattern to carry out data transmission.

10 Claims, 6 Drawing Sheets

(56) References Cited

FOREIGN PATENT DOCUMENTS

| CN | 106160970 A | 11/2016 |
|---|---|---|
| CN | 107431682 A | 12/2017 |
| CN | 108024342 A | 5/2018 |
| CN | 108631998 A | 10/2018 |
| WO | 2017035807 A1 | 3/2017 |
| WO | 2018082705 A1 | 5/2018 |

OTHER PUBLICATIONS

ZTE,"Email discussion to collect detailed description of the NOMA schemes", 3GPP TSG RAN WG1 Meeting #94, Chengdu, China, Oct. 8-12, 2018, total 54 pages, R1-18xxxxx.

Huawei et al., "Text proposal on DMRS assumption for NOMA evaluation", 3GPP TSG RAN WG1 Meeting #95, Spokane, USA, Nov. 12-16, 2018, total 1 page, R1-1814280.

ZTE,"Email discussion to collect detailed description of the NOMA schemes", 3GPP TSG RAN1 Gothenburg, Sweden, Aug. 20-24, 2018, total 54 pages, R1-1809844.

Mitsubishi Electric, "DMRS designs for NR MIMO", 3GPP TSG RAN WG1 Meeting #88bis, Spokane, USA, Apr. 3-7, 2017, total 12 pages, R1-1705814.

Samsung, "Remaining details on DL DMRS", 3GPP TSG RAN WG1 Meeting #90, Prague, Czechia, Aug. 21-25, 2017, total 9 pages, R1-1713603.

CMCC,"Discussion on NoMA related procedures", 3GPP TSG RAN WG1 Meeting #94, Gothenburg, Sweden, Aug. 20-24, 2018, total 3 pages, R1-1808835.

InterDigital Inc., "Details of IDMA Transmitter Processing", 3GPP TSG RAN WG1 Meeting #94bis, Chengdu, China, Oct. 8-12, 2018, total 5 pages, R1-1811194.

DATA TRANSMISSION METHOD AND DEVICE

CROSS-REFERENCE OF RELATED APPLICATIONS

The present application is a National Stage of International Application No. PCT/CN2019/106812, filed on Sep. 19, 2019, which claims the priority from Chinese Patent Application No. 201811535526.4, filed with the Chinese Patent Office on Dec. 14, 2018 and entitled "Data Transmission Method and Device", both of which are hereby incorporated by reference in their entireties.

FIELD

The present application relates to the field of communication technologies, and particularly to a data transmission method and device.

BACKGROUND

For the Cyclic Prefix-Orthogonal Frequency Division Multiplex (CP-OFDM) waveform, the maximum number of DeModulation Reference Signal (DMRS) orthogonal ports supported currently by the 5th Generation (5G) New Radio (NR) is 12.

For the Discrete Fourier Transform-Spread-OFDM (DFT-s-OFDM) waveform, the maximum number of DMRS orthogonal ports supported currently by the NR is 8.

The typical number of DMRS orthogonal ports in the NR uplink scheduling-free scenario is 24 or 48. The current number of existing DMRS orthogonal ports in the NR cannot meet the non-orthogonal multiple access transmission requirement in the uplink scheduling-free scenario.

BRIEF SUMMARY

The embodiments of the present application provide a data transmission method and device, to better support the non-orthogonal multiple access data transmission in the uplink scheduling-free scenario.

In a first aspect, an embodiment of the present application provides a data transmission method, including:
  determining a DMRS orthogonal port pattern of an uplink data channel, and a quantity of DMRS orthogonal ports is greater than 12;
  using the DMRS orthogonal port pattern for data transmission.

The embodiment of the present application determines the DMRS orthogonal port pattern of the uplink data channel with this method, and the quantity of DMRS orthogonal ports is greater than 12; and the DMRS orthogonal port pattern is used for data transmission, to better support the non-orthogonal multiple access transmission in the uplink scheduling-free scenario.

In a second aspect, an embodiment of the present application provides a data transmission device, including:
  a memory configured to store program instructions;
  a processor configured to invoke the program instructions stored in the memory, and in accordance with obtained program, perform the process of:
    determining a DMRS orthogonal port pattern of an uplink data channel, and a quantity of DMRS orthogonal ports is greater than 12;
    using the DMRS orthogonal port pattern for data transmission.

In a third aspect, an embodiment of the present application provides another data transmission device, including:
  a first device configured to determine a DMRS orthogonal port pattern of an uplink data channel, and a quantity of DMRS orthogonal ports is greater than 12;
  a second device configured to use the DMRS orthogonal port pattern for data transmission.

In a fourth aspect, another embodiment of the present application provides a computing device, which includes a memory and a processor, and the memory is configured to store the program instructions, and the processor is configured to invoke the program instructions stored in the memory and perform any one of the above-mentioned methods in accordance with the obtained program.

In a fifth aspect, another embodiment of the present application provides a computer storage medium storing the computer executable instructions which are configured to cause the computer to perform any one of the above-mentioned methods.

BRIEF DESCRIPTION OF THE DRAWINGS

In order to illustrate the embodiments of the present application more clearly, the accompanying figures which need to be used in describing the embodiments will be introduced below briefly.

DETAILED DESCRIPTION OF THE EMBODIMENTS

Figure 1:
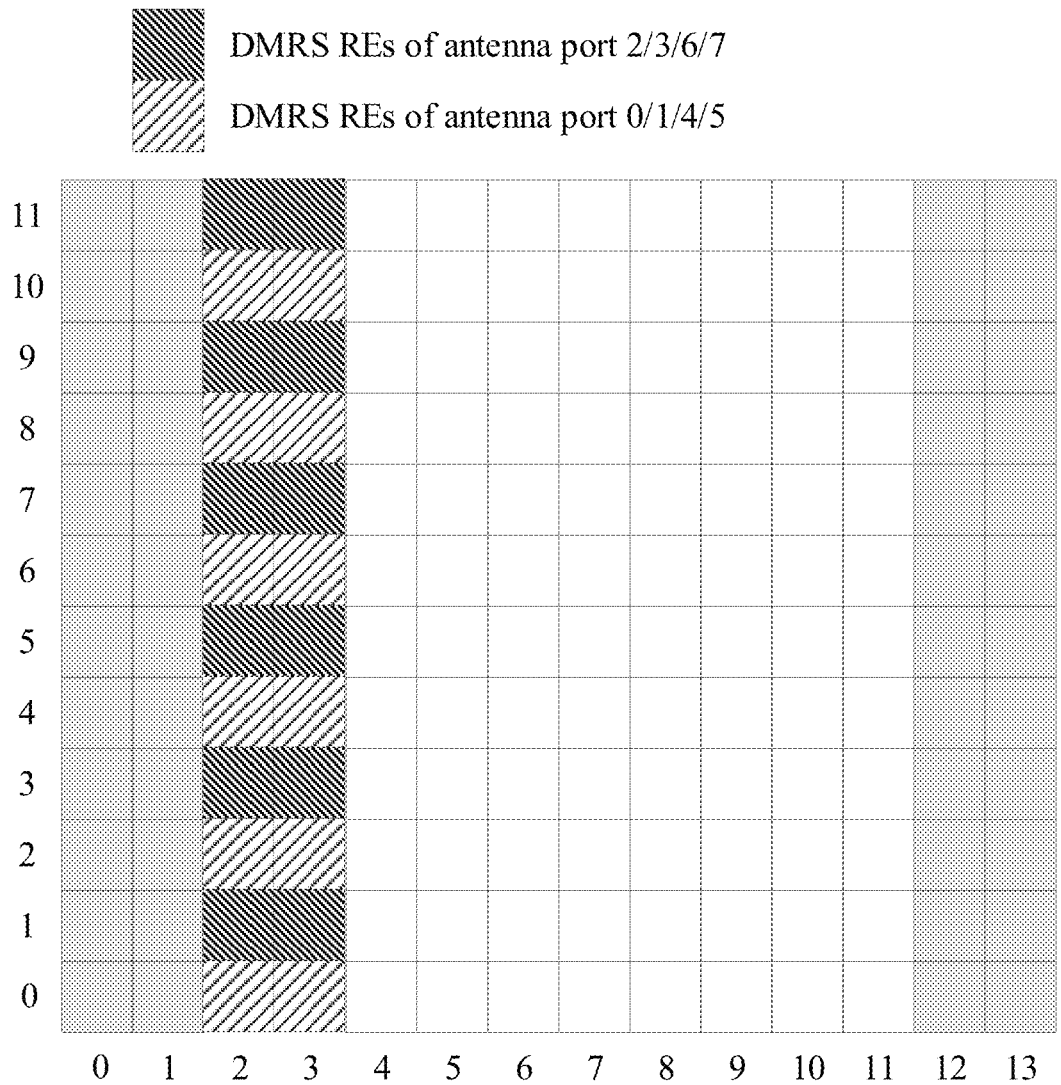
FIG. 1 is a schematic diagram of the configuration type 1 of DMRS orthogonal ports under CP-OFDM and DFT-s-OFDM waveforms provided by an embodiment of the present application (2 OFDM symbols)

The embodiments of the present application will be described clearly and completely below in combination with the accompanying drawings in the embodiments of the present application. The described embodiments are only a part of the embodiments of the present application but not all the embodiments.

The typical number of DMRS orthogonal ports required for 5G NR uplink Non-Orthogonal Multiple Access (NOMA) in the scheduling-free scenario is 24 or 48, but the maximum number of DMRS orthogonal ports supported currently by the NR is 12, which cannot meet this requirement.

For this requirement, the embodiments of the present application provides a pattern design of DMRS orthogonal ports when the number of DMRS orthogonal ports of the uplink data channel is 24 or 48, to better support the non-orthogonal multiple address data transmission in the uplink scheduling-free scenario.

Thus, the embodiments of the present application provide a data transmission method and device, to better support the non-orthogonal multiple access data transmission in the uplink scheduling-free scenario.

Here, the method and apparatus are based on the same application concept. Since the principle of solving the problem in the method is similar to that in the apparatus, the implementations of the apparatus and method can refer to each other, and the repeated description thereof will be omitted.

The embodiments of the present application may be applicable to various systems, especially 5G systems. For example, the applicable systems may be: Global System of Mobile communication (GSM) system, Code Division Multiple Access (CDMA) system, Wideband Code Division Multiple Access (WCDMA) system, General Packet Radio Service (GPRS) system, Long Term Evolution (LTE) system, LTE Frequency Division Duplex (FDD) system, LTE Time Division Duplex (TDD) system, Universal Mobile Telecommunication System (UMTS), Worldwide interoperability for Microwave Access (WiMAX) system, 5G system and 5G NR system, etc. These systems all include terminal devices and network devices.

The terminal device involved in the embodiments of the present application may be a device for providing the voice and/or data connectivity to the user, a handheld device with the wireless connection function, or other processing device connected to the wireless modem. In different systems, the terminal device may have different names. For example, in a 5G system, the terminal device may be referred to as User Equipment (UE).

The wireless terminal device can communicate with one or more core networks via the Radio Access Network (RAN), and the wireless terminal device can be a mobile terminal, such as a mobile telephone (or called "cellular" telephone), and a computer with the mobile terminal, for example, can be a portable, pocket, handheld, computer built-in or vehicle-carried mobile device, and they exchange the voice and/or data with the radio access network. For example, Personal Communication Service (PCS) telephone, cordless telephone, Session Initiation Protocol (SIP) telephone, Wireless Local Loop (WLL) station, Personal Digital Assistant (PDA) and other devices. The wireless terminal device can also be called system, subscriber device, subscriber station, mobile station, mobile, remote station, access point, remote terminal, access terminal, user terminal, user agent, user device, which is not limited in the embodiments of the present application.

The network device involved in the embodiments of the present application may be a base station, which may include cells. Depending on specific application scenarios, the base station may also be called access point, or may refer to the device in the access network communicating with the wireless terminal via one or more sectors over the air interface or other names.

The network device may be used to perform the inter-conversion between the received air frame and Internet Protocol (IP) packet, and used as the router between the wireless terminal device and the rest of the access network, and the rest of the access network may include IP networks. The network device can further coordinate the attribute management of the air interface.

For example, the network device involved in the embodiments of the present application can be a network device (Base Transceiver Station (BTS)) in the GSM system or CDMA system, or can be a network device (NodeB) in the WCDMA system, or can be an evolutional network device (evolutional Node B (eNB or e-NodeB)) in the LTE system, a 5G base station in the 5G network architecture (next generation system), or can be a Home evolved Node B (HeNB), a relay node, femto, pico, etc., which is not limited in the embodiments of the present application.

The embodiments of the present application will be described below in detail with reference to the drawings of the specification. It should be noted that the showing order of the embodiments of the present application only represents the sequential order of the embodiments, but does not represent the pros and cons of the embodiments.

For the CP-OFDM waveform, the maximum number of DMRS orthogonal ports supported currently by the 5G NR is 12; and for the DFT-s-OFDM waveform, the maximum number of DMRS orthogonal ports supported currently by the NR is 8. The CP-OFDM waveform and DFT-s-OFDM waveform are respectively introduced below.

DMRS orthogonal ports under the CP-OFDM waveform:
  the DMRS orthogonal ports under the CP-OFDM waveform supports two configuration types.
Configuration Type 1:
  the following takes the occupation of 2 OFDM symbols in the time domain as an example to illustrate the configuration type 1 of the DMRS orthogonal ports. At this time, the maximum number of DMRS orthogonal ports (hereinafter referred to as ports) that can be supported is 8. As shown in FIG. 1, ports 0, 1, 4 and 5 share the same time-frequency resources, ports 2, 3, 6 and 7 share the same time-frequency resources, and different DMRS orthogonal ports are implemented in the Frequency Division Multiplexing (FDM) way between port 0/1/4/5 and port 2/3/6/7. The Frequency Domain-Orthogonal Cover Code (FD-OCC) represents the orthogonal spreading code used between two Resource Elements (REs) separated by one RE in the frequency domain; and the Time Domain-Orthogonal Cover Code (TD-OCC) represents the orthogonal spreading code used between two adjacent OFDM symbols in the time domain.

Ports 0, 1, 4 and 5 share the same time-frequency resources, occupy even-numbered REs in a Physical Resource Block (PRB) in the frequency domain, and occupy 2 OFDM symbols in the time domain; and different DMRS orthogonal ports are further implemented through an FD-OCC sequence and a TD-OCC sequence where the number of elements contained in each sequence (i.e., sequence length) is 2;
  Port 0: FD-OCC sequence $\{1, 1\}$+TD-OCC sequence $\{1, 1\}$;
  Port 1: FD-OCC sequence $\{1, -1\}$+TD-OCC sequence $\{1, 1\}$;
  Port 4: FD-OCC sequence $\{1, 1\}$+TD-OCC sequence $\{1, -1\}$;
  Port 5: FD-OCC sequence $\{1, -1\}$+TD-OCC sequence $\{1, -1\}$;
  and the FD-OCC sequence $\{1, 1\}$ means FD-OCC sequence=$\{1, 1\}$; the TD-OCC sequence $\{1, 1\}$ means TD-OCC sequence={1, 1}, and the same applies to other similar descriptions, which will not be repeated.

Ports 2, 3, 6 and 7 share the same time-frequency resources, occupy odd-numbered REs in a PRB in the frequency domain, and occupy 2 OFDM symbols in the time domain; and different DMRS orthogonal ports are further implemented through an FD-OCC sequence and a TD-OCC sequence where the length of each sequence is 2;

Port 2: FD-OCC sequence {1, 1}+TD-OCC sequence {1, 1};
Port 3: FD-OCC sequence {1, −1}+TD-OCC sequence {1, 1};
Port 6: FD-OCC sequence {1, 1}+TD-OCC sequence {1, −1};
Port 7: FD-OCC sequence {1, −1}+TD-OCC sequence {1, −1}.

Figure 2:
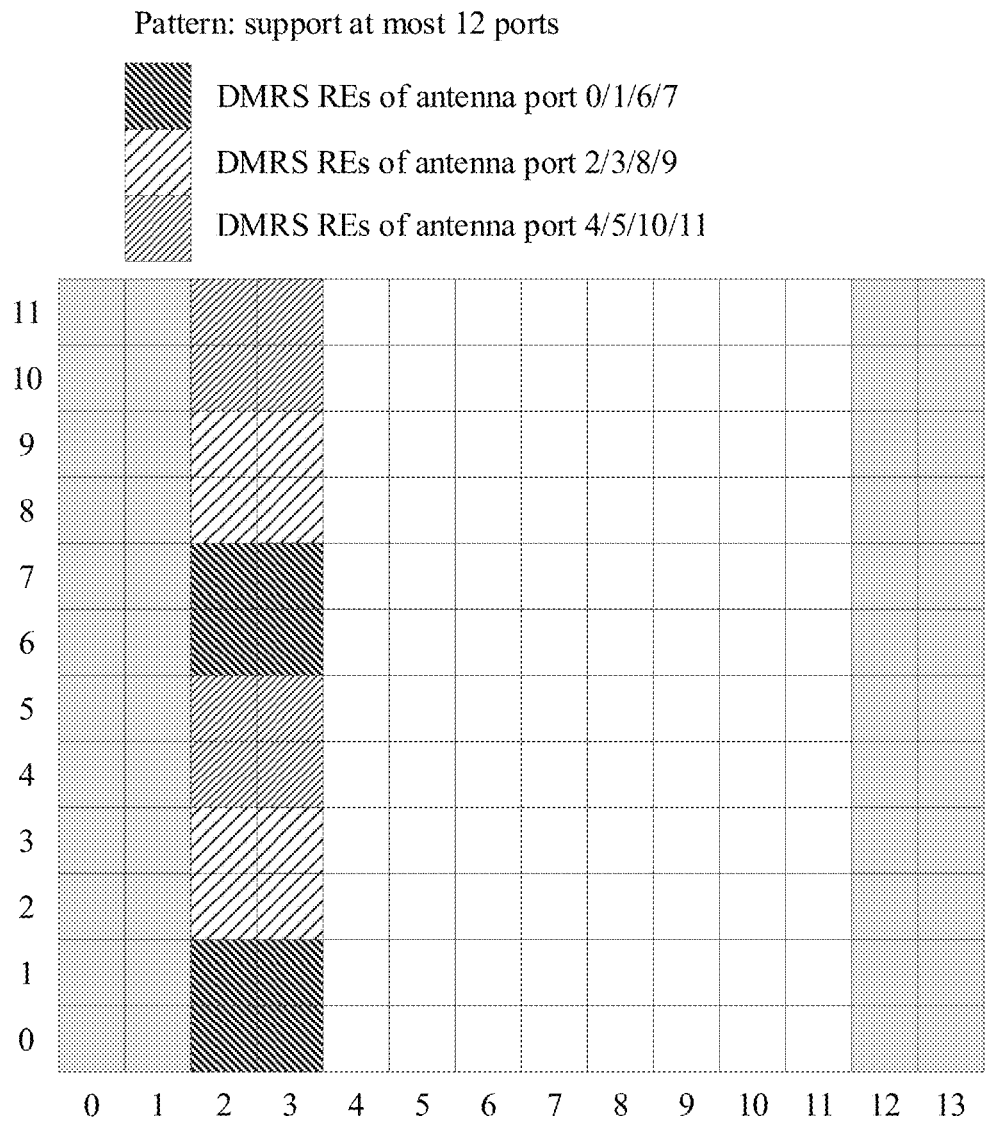
FIG. 2 is a schematic diagram of the configuration type 2 of DMRS orthogonal ports under the CP-OFDM waveform provided by an embodiment of the present application (2 OFDM symbols)

Configuration Type 2:

the following takes the occupation of 2 OFDM symbols in the time domain as an example to illustrate the configuration type 2 of the DMRS orthogonal ports. At this time, the maximum number of DMRS orthogonal ports that can be supported is 12. As shown in FIG. 2, ports 0, 1, 6 and 7 share the same time-frequency resources, ports 2, 3, 8 and 9 share the same time-frequency resources, ports 4, 5, 10 and 11 share the same time-frequency resources, and different DMRS orthogonal ports are implemented in the FDM way among the port 0/1/6/7, port 2/3/8/9 and port 4/5/10/11.

Ports 0, 1, 6 and 7 share the same time-frequency resources, occupy REs #0, 1, 6 and 7 in a PRB in the frequency domain, and occupy 2 OFDM symbols in the time domain; and different DMRS orthogonal ports are further implemented through an FD-OCC sequence and a TD-OCC sequence where the length of each sequence is 2;

Port 0: FD-OCC sequence {1, 1}+TD-OCC sequence {1, 1};
Port 1: FD-OCC sequence {1, −1}+TD-OCC sequence {1, 1};
Port 6: FD-OCC sequence {1, 1}+TD-OCC sequence {1, −1};
Port 7: FD-OCC sequence {1, −1}+TD-OCC sequence {1, −1}.

Ports 2, 3, 8 and 9 share the same time-frequency resources, occupy REs #2, 3, 8 and 9 in a PRB in the frequency domain, and occupy 2 OFDM symbols in the time domain; and different DMRS orthogonal ports are further implemented through an FD-OCC sequence and a TD-OCC sequence where the length of each sequence is 2;

Port 2: FD-OCC sequence {1, 1}+TD-OCC sequence {1, 1};
Port 3: FD-OCC sequence {1, −1}+TD-OCC sequence {1, 1};
Port 8: FD-OCC sequence {1, 1}+TD-OCC sequence {1, −1};
Port 9: FD-OCC sequence {1, −1}+TD-OCC sequence {1, −1}.

Ports 4, 5, 10 and 11 share the same time-frequency resources, occupy REs #4, 5, 10 and 11 in a PRB in the frequency domain, and occupy 2 OFDM symbols in the time domain; and different DMRS orthogonal ports are further implemented through an FD-OCC sequence and a TD-OCC sequence where the length of each sequence is 2;

Port 4: FD-OCC sequence {1, 1}+TD-OCC sequence {1, 1};
Port 5: FD-OCC sequence {1, −1}+TD-OCC sequence {1, 1};
Port 10: FD-OCC sequence {1, 1}+TD-OCC sequence {1, −1};
Port 11: FD-OCC sequence {1, −1}+TD-OCC sequence {1, −1}.

The introduction of the DMRS orthogonal ports under the DFT-s-OFDM waveform is as follows.

Only the DMRS configuration type 1 is supported under the DFT-s-OFDM waveform. The following takes the occupation of 2 OFDM symbols in the time domain as an example for illustration. At this time, the maximum number of DMRS orthogonal ports that can be supported is 8. Continue to refer to FIG. 1. Ports 0, 1, 4 and 5 share the same time-frequency resources, ports 2, 3, 6 and 7 share the same time-frequency resources, and different DMRS orthogonal ports are implemented in the FDM way between port 0/1/4/5 and port 2/3/6/7. The DFT-s-OFDM waveform is the same as the CP-OFDM waveform in terms of physical resource mapping, and the difference is that the DMRS sequence is generated inside the Physical Uplink Shared Channel (PUSCH) instead of being intercepted according to the frequency domain position of the PUSCH.

Ports 0, 1, 4 and 5 share the same time-frequency resources, occupy even-numbered REs in a PRB in the frequency domain, and occupy 2 OFDM symbols in the time domain; and different DMRS orthogonal ports are further implemented through an FD-OCC sequence and a TD-OCC sequence where the length of each sequence is 2;

Port 0: FD-OCC sequence {1, 1}+TD-OCC sequence {1, 1};
Port 1: FD-OCC sequence {1, −1}+TD-OCC sequence {1, 1};
Port 4: FD-OCC sequence {1, 1}+TD-OCC sequence {1, −1};
Port 5: FD-OCC sequence {1, −1}+TD-OCC sequence {1, −1}.

Ports 2, 3, 6 and 7 share the same time-frequency resources, occupy odd-numbered REs in a PRB in the frequency domain, and occupy 2 OFDM symbols in the time domain; and different DMRS orthogonal ports are further implemented through an FD-OCC sequence and a TD-OCC sequence where the length of each sequence is 2;

Port 2: FD-OCC sequence {1, 1}+TD-OCC sequence {1, 1};
Port 3: FD-OCC sequence {1, −1}+TD-OCC sequence {1, 1};
Port 6: FD-OCC sequence {1, 1}+TD-OCC sequence {1, −1};
Port 7: FD-OCC sequence {1, −1}+TD-OCC sequence {1, −1}.

In the NR uplink Non-Orthogonal Multiple Access (NOMA) scheduling-free scenario, the number of DMRS orthogonal ports required is greater than 12 (for example, the typical values are 24 and 48), but the number of NR DMRS orthogonal ports described above is only 12, which cannot meet this requirement. Although the number of NR DMRS ports described above can be expanded in the non-orthogonal manner, the mutual interference between non-orthogonal DMRS ports will cause the reduced performance of activation detection and channel estimation based on DMRS ports, and causing the reduced performance of the overall system. Therefore, it is necessary to design DMRS orthogonal ports of which the number is greater than 12 (for example, the typical values are 24 and 48).

Therefore, the embodiments of the present application propose a design scheme for the DMRS orthogonal port pattern of the uplink data channel. The basic idea is to implement different DMRS orthogonal ports at orthogonal frequency-domain positions based on a given frequency division multiplexing factor, and then implement different DMRS orthogonal ports through orthogonal FD-OCC sequences for the CP-OFDM waveform and implement different DMRS orthogonal ports through the cyclic shift of the Zadoff-Chu (ZC) sequence for the DFT-s-OFDM waveform, and finally implement different DMRS orthogonal ports through orthogonal TD-OCC sequences.

Figure 3:
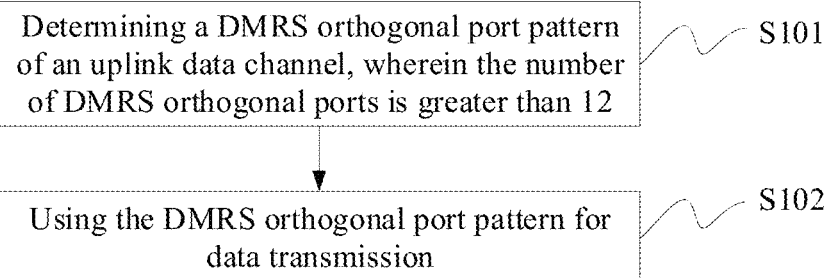
FIG. 3 is a flow schematic diagram of a data transmission method provided by an embodiment of the present application.

As shown in FIG. 3, a data transmission method provided by an embodiment of the present application includes:

S101: determining a DMRS orthogonal port pattern of an uplink data channel, and the number of DMRS orthogonal ports is greater than 12.

For example, the number of DMRS orthogonal ports is 24 or 48. Of course, it can also be other numbers, and not limited to 24 or 48.

S102: using the DMRS orthogonal port pattern for data transmission.

The embodiment of the present application provides the DMRS orthogonal port pattern when the number of DMRS orthogonal ports of the uplink data channel is greater than 12 (for example, is 24 or 48), to better support the non-orthogonal multiple access transmission in the uplink scheduling-free scenario, and can effectively satisfy the UE activation detection, channel estimation and data channel detection performance in the NOMA uplink scheduling-free scenario, and better supporting the non-orthogonal multiple access transmission in the uplink scheduling-free scenario.

In one embodiment, different DMRS orthogonal ports are implemented at orthogonal frequency-domain positions based on a given frequency division multiplexing factor in the DMRS orthogonal port pattern.

In one embodiment, for a CP-OFDM waveform, different DMRS orthogonal ports are further implemented through orthogonal FD-OCC sequences.

In one embodiment, for a DFT-s-OFDM waveform, different DMRS orthogonal ports are further implemented through cyclic shift of a ZC sequence.

In one embodiment, different DMRS orthogonal ports are further implemented through orthogonal TD-OCC sequences.

In one embodiment, for a CP-OFDM waveform, in the DMRS orthogonal port pattern, the number of DMRS orthogonal ports is P, the DMRS orthogonal ports occupy M OFDM symbols in the time domain, the Frequency Division Multiplexing (FDM) factor in the frequency domain is N, the length of an FD-OCC sequence is T, the length of a TD-OCC sequence is S, and P=N*T*S, and P is an integer value greater than 12, and N, T and S are integer values greater than or equal to 1. The specific values can be determined according to actual needs.

In one embodiment, for the CP-OFDM waveform, in the DMRS orthogonal port pattern, the number of DMRS orthogonal ports is 24, the DMRS orthogonal ports occupy 2 OFDM symbols in the time domain, the FDM factor in the frequency domain is 3, the length of the FD-OCC sequence is 4, the length of the TD-OCC sequence is 2.

In one embodiment, among 24 DMRS orthogonal ports, ports 0 to 7, ports 8 to 15 and ports 16 to 23 share same time-frequency resources respectively, and different DMRS orthogonal ports are implemented in an FDM way among the ports 0 to 7, ports 8 to 15 and ports 16 to 23; and:

the ports 0 to 7 share same time-frequency resources, occupy REs #0, 1, 2 and 3 in a PRB in the frequency domain, and occupy 2 OFDM symbols in the time domain, and different DMRS orthogonal ports are further implemented through an FD-OCC sequence with the sequence length of 4 and a TD-OCC sequence with the sequence length of 2;

the ports 8 to 15 share same time-frequency resources, occupy REs #4, 5, 6 and 7 in a PRB in the frequency domain, and occupy 2 OFDM symbols in the time domain, and different DMRS orthogonal ports are further implemented through an FD-OCC sequence with the sequence length of 4 and a TD-OCC sequence with the sequence length of 2;

the ports 16 to 23 share same time-frequency resources, occupy REs #8, 9, 10 and 11 in a PRB in the frequency domain, and occupy 2 OFDM symbols in the time domain, and different DMRS orthogonal ports are further implemented through an FD-OCC sequence with the sequence length of 4 and a TD-OCC sequence with the sequence length of 2.

In one embodiment, for the CP-OFDM waveform, in the DMRS orthogonal port pattern, the number of DMRS orthogonal ports is 48, the DMRS orthogonal ports occupy 4 OFDM symbols in the time domain, the FDM factor in the frequency domain is 3, the length of the FD-OCC sequence is 4, the length of the TD-OCC sequence is 4.

In one embodiment, among 48 DMRS orthogonal ports, ports 0 to 15, ports 16 to 31 and ports 32 to 47 share same time-frequency resources respectively, and different DMRS orthogonal ports are implemented in an FDM way among the ports 0 to 15, ports 16 to 31 and ports 32 to 47; and:

the ports 0 to 15 share same time-frequency resources, occupy REs #0, 1, 2 and 3 in a PRB in the frequency domain, and occupy 4 OFDM symbols in the time domain, and different DMRS orthogonal ports are further implemented through an FD-OCC sequence with the sequence length of 4 and a TD-OCC sequence with the sequence length of 4;

the ports 16 to 31 share same time-frequency resources, occupy REs #4, 5, 6 and 7 in a PRB in the frequency domain, and occupy 4 OFDM symbols in the time domain, and different DMRS orthogonal ports are further implemented through an FD-OCC sequence with the sequence length of 4 and a TD-OCC sequence with the sequence length of 4;

the ports 32 to 47 share same time-frequency resources, occupy REs #8, 9, 10 and 11 in a PRB in the frequency domain, and occupy 4 OFDM symbols in the time domain, and different DMRS orthogonal ports are further implemented through an FD-OCC sequence with the sequence length of 4 and a TD-OCC sequence with the sequence length of 4.

In one embodiment, for the DFT-s-OFDM waveform, in the DMRS orthogonal port pattern, the number of DMRS orthogonal ports is P, the DMRS orthogonal ports occupy M OFDM symbols in the time domain, the FDM factor in the frequency domain is N, the number of code-domain Cyclic Shifts (CSs) of a ZC sequence is R, and the length of a TD-OCC sequence is S. P=N*R*S is satisfied, where P is a positive integer greater than 12; N, R and S are all integer values greater than or equal to 1, and the specific values can be determined according to actual needs.

In one embodiment, for the DFT-s-OFDM waveform, in the DMRS orthogonal port pattern, the number of DMRS orthogonal ports is 24, the DMRS orthogonal ports occupy 2 OFDM symbols in the time domain, the FDM factor in the frequency domain is 3, the number of code-domain CSs of the ZC sequence is 4, and the length of the TD-OCC sequence is 2.

In one embodiment, among 24 DMRS orthogonal ports, ports 0 to 7, ports 8 to 15 and ports 16 to 23 share same time-frequency resources respectively, and different DMRS orthogonal ports are implemented in an FDM way among the ports 0 to 7, ports 8 to 15 and ports 16 to 23; and:

the ports 0 to 7 share same time-frequency resources, occupy REs #0, 3, 6 and 9 in a PRB in the frequency domain, and occupy 2 OFDM symbols in the time domain, and different DMRS orthogonal ports are further implemented through CS values of a ZC sequence of which the number is 4 and a TD-OCC sequence with the sequence length of 2;

the ports 8 to 15 share same time-frequency resources, occupy REs #1, 4, 7 and 10 in a PRB in the frequency domain, and occupy 2 OFDM symbols in the time domain, and different DMRS orthogonal ports are further implemented through CS values of a ZC sequence of which the number is 4 and a TD-OCC sequence with the sequence length of 2;

the ports 16 to 23 share same time-frequency resources, occupy REs #2, 5, 8 and 11 in a PRB in the frequency domain, and occupy 2 OFDM symbols in the time domain, and different DMRS orthogonal ports are further implemented through CS values of a ZC sequence of which the number is 4 and a TD-OCC sequence with the sequence length of 2.

In one embodiment, for the DFT-s-OFDM waveform, in the DMRS orthogonal port pattern, the number of DMRS orthogonal ports is 48, the DMRS orthogonal ports occupy 4 OFDM symbols in the time domain, the FDM factor in the frequency domain is 3, the number of code-domain CSs of the ZC sequence is 4, and the length of the TD-OCC sequence is 4.

In one embodiment, among 48 DMRS orthogonal ports, ports 0 to 15, ports 16 to 31 and ports 32 to 47 share same time-frequency resources respectively, and different DMRS orthogonal ports are implemented in an FDM way among the ports 0 to 15, ports 16 to 31 and ports 32 to 47; and:

the ports 0 to 15 share same time-frequency resources, occupy REs #0, 3, 6 and 9 in a PRB in the frequency domain, and occupy 4 OFDM symbols in the time domain, and different DMRS orthogonal ports are further implemented through CS values of a ZC sequence of which the number is 4 and a TD-OCC sequence with the sequence length of 4;

the ports 16 to 31 share same time-frequency resources, occupy REs #1, 4, 7 and 10 in a PRB in the frequency domain, and occupy 4 OFDM symbols in the time domain, and different DMRS orthogonal ports are further implemented through CS values of a ZC sequence of which the number is 4 and a TD-OCC sequence with the sequence length of 4;

the ports 32 to 47 share same time-frequency resources, occupy REs #2, 5, 8 and 11 in a PRB in the frequency domain, and occupy 4 OFDM symbols in the time domain, and different DMRS orthogonal ports are further implemented through CS values of a ZC sequence of which the number is 4 and a TD-OCC sequence with the sequence length of 4.

The embodiment of the present application can be applied to the terminal side and the network side.

Hereinafter, four embodiments will be described in detail with reference to the accompanying drawings.

First Embodiment

Figure 4:
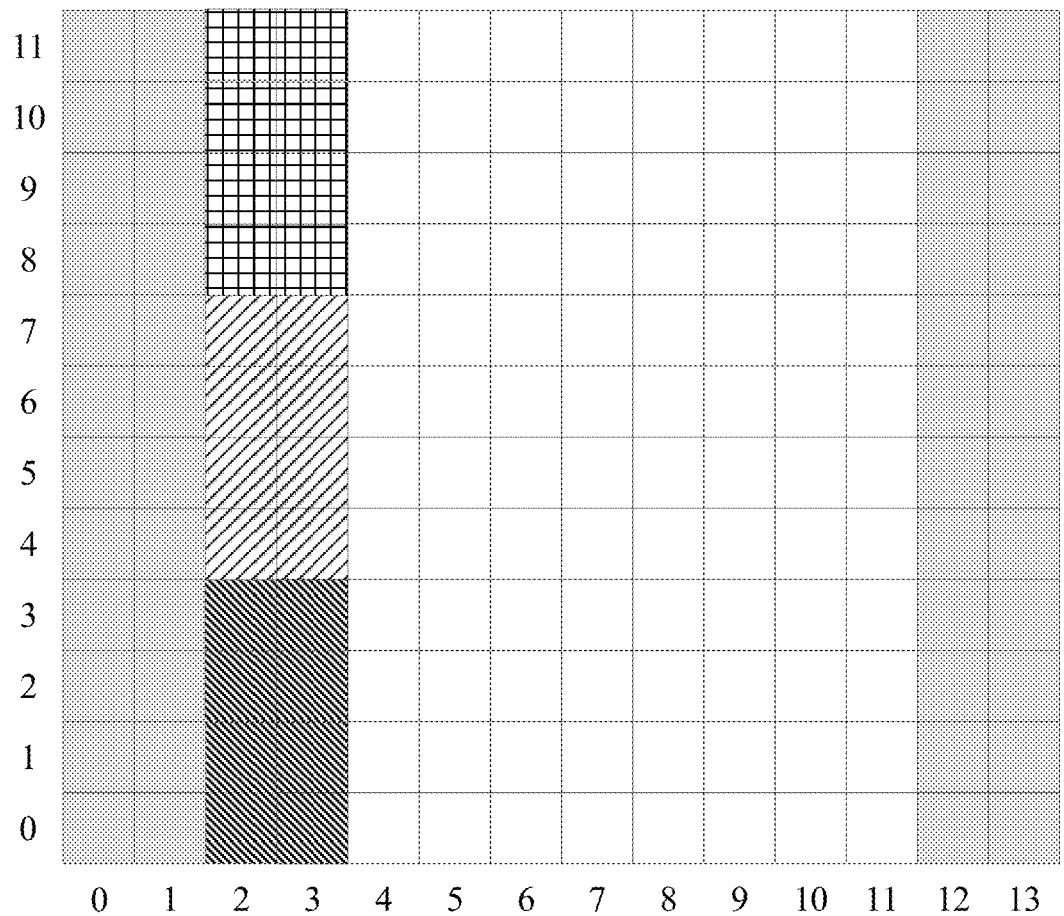
FIG. 4 is a schematic diagram of the configuration type 2 that supports 24 DMRS orthogonal ports under CP-OFDM and DFT-s-OFDM waveforms provided by an embodiment of the present application (2 OFDM symbols)

As shown in FIG. 4, the embodiment of the present application supports 24 DMRS orthogonal ports under the CP-OFDM waveform, which is the configuration type 2.

The maximum number P of DMRS orthogonal ports that can be supported in the embodiment of the present application is 24. 2 OFDM symbols are occupied in the time domain (OFDM symbol #2 and symbol #3 are occupied in the time domain (abscissa) in FIG. 4), and the Frequency Division Multiplexing (FDM) factor in the frequency domain is 3 (12 REs contained in a PRB are divided into 3 groups in the frequency domain (ordinate) in FIG. 4, where the first group includes REs #0, 1, 2 and 3; the second group includes REs #4, 5, 6 and 7; and the third group includes REs #8, 9, 10 and 11), the length of the FD-OCC sequence is 4 (specific sequence values refer to the introduction of each port below), and the length of the TD-OCC sequence is 2 (specific sequence values refer to the introduction of each port below).

The advantage of the embodiments of the present application is: based on the configuration type 2 of the CP-OFDM waveform, an orthogonal cover code with the length of 4 is used for frequency domain multiplexing on 4 consecutive REs in the frequency domain, which can basically ensure that the frequency-domain channel response of the 4 REs is unchanged, so that the accuracy performance of the channel estimation can be guaranteed. If based on the configuration type 1 of the CP-OFDM waveform, the total frequency-domain bandwidth in which the orthogonal cover code with the length of 4 is used for frequency domain multiplexing on 4 REs with the frequency-domain interval of 2 is 8 REs, and at this time, the frequency-domain channel response on the 4 REs using the FD-OCC may change, and reducing the accuracy performance of the channel estimation. Therefore, the embodiments of the present application can provide the higher channel estimation accuracy performance.

As shown in FIG. 4, ports 0 to 7, ports 8 to 15 and ports 16 to 23 share the same time-frequency resources respectively, and different DMRS orthogonal ports are implemented in the FDM way among the ports 0 to 7, ports 8 to 15 and ports 16 to 23.

Ports 0 to 7 share the same time-frequency resources, occupy REs #0, 1, 2 and 3 in a PRB in the frequency domain, and occupy 2 OFDM symbols in the time domain, and different DMRS orthogonal ports are further implemented through an FD-OCC sequence with the sequence length of 4 and a TD-OCC sequence with the sequence length of 2;

Port 0: FD-OCC sequence {1, 1, 1, 1}+TD-OCC sequence {1, 1};
Port 1: FD-OCC sequence {1, 1, −1, −1}+TD-OCC sequence {1, 1};
Port 2: FD-OCC sequence {1, −1, −1, 1}+TD-OCC sequence {1, 1};
Port 3: FD-OCC sequence {1, −1, 1, −1}+TD-OCC sequence {1, 1};
Port 4: FD-OCC sequence {1, 1, 1, 1}+TD-OCC sequence {1, −1};
Port 5: FD-OCC sequence {1, 1, −1, −1}+TD-OCC sequence {1, −1};
Port 6: FD-OCC sequence {1, −1, −1, 1}+TD-OCC sequence {1, −1};
Port 7: FD-OCC sequence {1, −1, 1, −1}+TD-OCC sequence {1, −1}.

Ports 8 to 15 share the same time-frequency resources, occupy REs #4, 5, 6 and 7 in a PRB in the frequency domain, and occupy 2 OFDM symbols in the time domain, and different DMRS orthogonal ports are further implemented through an FD-OCC sequence with the sequence length of 4 and a TD-OCC sequence with the sequence length of 2;

Port 8: FD-OCC sequence {1, 1, 1, 1}+TD-OCC sequence {1, 1};

Port 9: FD-OCC sequence {1, 1, −1, −1}+TD-OCC sequence {1, 1};
Port 10: FD-OCC sequence {1, −1, −1, 1}+TD-OCC sequence {1, 1};
Port 11: FD-OCC sequence {1, −1, 1, −1}+TD-OCC sequence {1, 1};
Port 12: FD-OCC sequence {1, 1, 1, 1}+TD-OCC sequence {1, −1};
Port 13: FD-OCC sequence {1, 1, −1, −1}+TD-OCC sequence {1, −1};
Port 14: FD-OCC sequence {1, −1, −1, 1}+TD-OCC sequence {1, −1};
Port 15: FD-OCC sequence {1, −1, 1, −1}+TD-OCC sequence {1, −1}.

Ports 16 to 23 share the same time-frequency resources, occupy REs #8, 9, 10 and 11 in a PRB in the frequency domain, and occupy 2 OFDM symbols in the time domain, and different DMRS orthogonal ports are further implemented through an FD-OCC sequence with the sequence length of 4 and a TD-OCC sequence with the sequence length of 2;

Port 16: FD-OCC sequence {1, 1, 1, 1}+TD-OCC sequence {1, 1};
Port 17: FD-OCC sequence {1, 1, −1, −1}+TD-OCC sequence {1, 1};
Port 18: FD-OCC sequence {1, −1, −1, 1}+TD-OCC sequence {1, 1};
Port 19: FD-OCC sequence {1, −1, 1, −1}+TD-OCC sequence {1, 1};
Port 20: FD-OCC sequence {1, 1, 1, 1}+TD-OCC sequence {1, −1};
Port 21: FD-OCC sequence {1, 1, −1, −1}+TD-OCC sequence {1, −1};
Port 22: FD-OCC sequence {1, −1, −1, 1}+TD-OCC sequence {1, −1};
Port 23: FD-OCC sequence {1, −1, 1, −1}+TD-OCC sequence {1, −1}.

Second Embodiment

Figure 5:
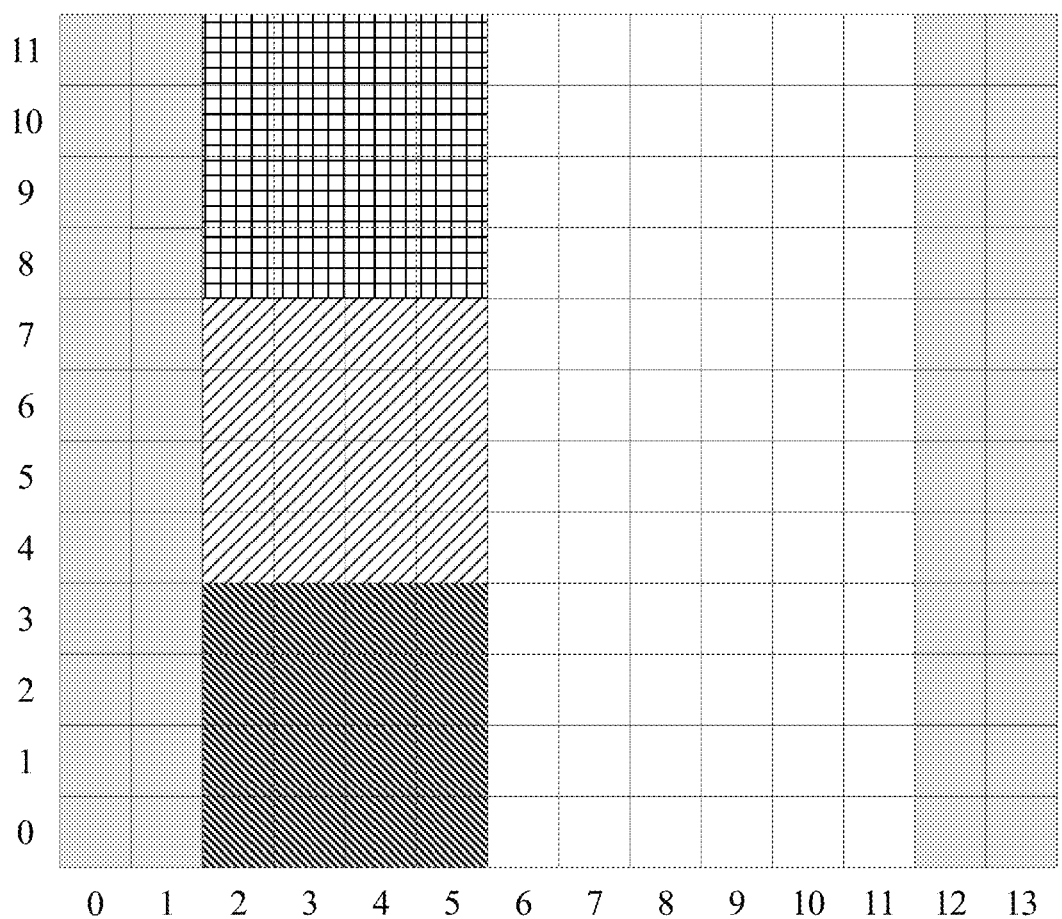
FIG. 5 is a schematic diagram of the configuration type 2 that supports 48 DMRS orthogonal ports under the CP-OFDM waveform provided by an embodiment of the present application (4 OFDM symbols)

As shown in FIG. 5, the embodiment of the present application supports 48 DMRS orthogonal ports under the CP-OFDM waveform, which is the configuration type 2. The maximum number P of DMRS orthogonal ports that can be supported in the embodiment of the present application is 48. 4 OFDM symbols are occupied in the time domain, the FDM factor in the frequency domain is 3, the length of the FD-OCC sequence is 4, and the length of the TD-OCC sequence is 4.

The advantages of the embodiment of the present application are the same as those of the first embodiment, and the difference is increasing the length of the TD-OCC sequence to support a larger number of DMRS orthogonal ports at the cost of increasing the overhead of the time-domain OFDM symbols.

As shown in FIG. 5, ports 0 to 15, ports 16 to 31 and ports 32 to 47 share the same time-frequency resources respectively, and different DMRS orthogonal ports are implemented in the FDM way among the ports 0 to 15, ports 16 to 31 and ports 32 to 47.

Ports 0 to 15 share the same time-frequency resources, occupy REs #0, 1, 2, and 3 in a PRB in the frequency domain, and occupy 4 OFDM symbols in the time domain, and different DMRS orthogonal ports are further implemented through an FD-OCC sequence with the sequence length of 4 and a TD-OCC sequence with the sequence length of 4;

Port 0: FD-OCC sequence {1, 1, 1, 1}+TD-OCC sequence {1, 1, 1, 1};
Port 1: FD-OCC sequence {1, 1, −1, −1}+TD-OCC sequence {1, 1, 1, 1};
Port 2: FD-OCC sequence {1, −1, −1, 1}+TD-OCC sequence {1, 1, 1, 1};
Port 3: FD-OCC sequence {1, −1, 1, −1}+TD-OCC sequence {1, 1, 1, 1};
Port 4: FD-OCC sequence {1, 1, 1, 1}+TD-OCC sequence {1, 1, −1, −1};
Port 5: FD-OCC sequence {1, 1, −1, −1}+TD-OCC sequence {1, 1, −1, −1};
Port 6: FD-OCC sequence {1, −1, −1, 1}+TD-OCC sequence {1, 1, −1, −1};
Port 7: FD-OCC sequence {1, −1, 1, −1}+TD-OCC sequence {1, 1, −1, −1};
Port 8: FD-OCC sequence {1, 1, 1, 1}+TD-OCC sequence {1, −1, −1, 1};
Port 9: FD-OCC sequence {1, 1, −1, −1}+TD-OCC sequence {1, −1, −1, 1};
Port 10: FD-OCC sequence {1, −1, −1, 1}+TD-OCC sequence {1, −1, −1, 1};
Port 11: FD-OCC sequence {1, −1, 1, −1}+TD-OCC sequence {1, −1, −1, 1};
Port 12: FD-OCC sequence {1, 1, 1, 1}+TD-OCC sequence {1, −1, 1, −1};
Port 13: FD-OCC sequence {1, 1, −1, −1}+TD-OCC sequence {1, −1, 1, −1};
Port 14: FD-OCC sequence {1, −1, −1, 1}+TD-OCC sequence {1, −1, 1, −1};
Port 15: FD-OCC sequence {1, −1, 1, −1}+TD-OCC sequence {1, −1, 1, −1}.

Ports 16 to 31 share the same time-frequency resources, occupy REs #4, 5, 6 and 7 in a PRB in the frequency domain, and occupy 4 OFDM symbols in the time domain, and different DMRS orthogonal ports are further implemented through an FD-OCC sequence with the sequence length of 4 and a TD-OCC sequence with the sequence length of 4;

Port 16: FD-OCC sequence {1, 1, 1, 1}+TD-OCC sequence {1, 1, 1, 1};
Port 17: FD-OCC sequence {1, 1, −1, −1}+TD-OCC sequence {1, 1, 1, 1};
Port 18: FD-OCC sequence {1, −1, −1, 1}+TD-OCC sequence {1, 1, 1, 1};
Port 19: FD-OCC sequence {1, −1, 1, −1}+TD-OCC sequence {1, 1, 1, 1};
Port 20: FD-OCC sequence {1, 1, 1, 1}+TD-OCC sequence {1, 1, −1, −1};
Port 21: FD-OCC sequence {1, 1, −1, −1}+TD-OCC sequence {1, 1, −1, −1};
Port 22: FD-OCC sequence {1, −1, −1, 1}+TD-OCC sequence {1, 1, −1, −1};
Port 23: FD-OCC sequence {1, −1, 1, −1}+TD-OCC sequence {1, 1, −1, −1};
Port 24: FD-OCC sequence {1, 1, 1, 1}+TD-OCC sequence {1, −1, −1, 1};
Port 25: FD-OCC sequence {1, 1, −1, −1}+TD-OCC sequence {1, −1, −1, 1};
Port 26: FD-OCC sequence {1, −1, −1, 1}+TD-OCC sequence {1, −1, −1, 1};
Port 27: FD-OCC sequence {1, −1, 1, −1}+TD-OCC sequence {1, −1, −1, 1};
Port 28: FD-OCC sequence {1, 1, 1, 1}+TD-OCC sequence {1, −1, 1, −1};
Port 29: FD-OCC sequence {1, 1, −1, −1}+TD-OCC sequence {1, −1, 1, −1};

Port 30: FD-OCC sequence {1, −1, −1, 1}+TD-OCC sequence {1, −1, 1, −1};
Port 31: FD-OCC sequence {1, −1, 1, −1}+TD-OCC sequence {1, −1, 1, −1}.

Ports 32 to 47 share the same time-frequency resources, occupy REs #8, 9, 10 and 11 in a PRB in the frequency domain, and occupy 4 OFDM symbols in the time domain, and different DMRS orthogonal ports are further implemented through an FD-OCC sequence with the sequence length of 4 and a TD-OCC sequence with the sequence length of 4;
Port 32: FD-OCC sequence {1, 1, 1, 1}+TD-OCC sequence {1, 1, 1, 1};
Port 33: FD-OCC sequence {1, 1, −1, −1}+TD-OCC sequence {1, 1, 1, 1};
Port 34: FD-OCC sequence {1, −1, −1, 1}+TD-OCC sequence {1, 1, 1, 1};
Port 35: FD-OCC sequence {1, −1, 1, −1}+TD-OCC sequence {1, 1, 1, 1};
Port 36: FD-OCC sequence {1, 1, 1, 1}+TD-OCC sequence {1, 1, −1, −1};
Port 37: FD-OCC sequence {1, 1, −1, −1}+TD-OCC sequence {1, 1, −1, −1};
Port 38: FD-OCC sequence {1, −1, −1, 1}+TD-OCC sequence {1, 1, −1, −1};
Port 39: FD-OCC sequence {1, −1, 1, −1}+TD-OCC sequence {1, 1, −1, −1};
Port 40: FD-OCC sequence {1, 1, 1, 1}+TD-OCC sequence {1, −1, −1, 1};
Port 41: FD-OCC sequence {1, 1, −1, −1}+TD-OCC sequence {1, −1, −1, 1};
Port 42: FD-OCC sequence {1, −1, −1, 1}+TD-OCC sequence {1, −1, −1, 1};
Port 43: FD-OCC sequence {1, −1, 1, −1}+TD-OCC sequence {1, −1, −1, 1};
Port 44: FD-OCC sequence {1, 1, 1, 1}+TD-OCC sequence {1, −1, 1, −1};
Port 45: FD-OCC sequence {1, 1, −1, −1}+TD-OCC sequence {1, −1, 1, −1};
Port 46: FD-OCC sequence {1, −1, −1, 1}+TD-OCC sequence {1, −1, 1, −1};
Port 47: FD-OCC sequence {1, −1, 1, −1}+TD-OCC sequence {1, −1, 1, −1}.

Third Embodiment

Continue to refer to FIG. 4. The maximum number P of DMRS orthogonal ports under the DFT-s-OFDM waveform supported by the embodiment of the present application is 24. 2 OFDM symbols are occupied in the time domain, the FDM factor in the frequency domain is 3, the number of code-domain Cyclic Shifts (CSs) of the ZC sequence is 4, and the length of the TD-OCC sequence is 2.

The advantage of the embodiment of the present application is that the Frequency Division Multiplexing (FDM) with a multiplexing factor of 3 is performed at the frequency domain interval of 3 REs, and 4 orthogonal DMRS ports are supported based on 4 kinds of code-domain CSs (for example: CS values 0, 3, 6 and 9) of the ZC sequence. Since the ZC sequence has the ideal periodic auto-correlation performance under synchronization conditions, the accuracy performance of channel estimation can be ensured. If the FD-OCC is adopted, the frequency-domain channel response on 4 REs where the frequency domain interval of the FD-OCC is 3 REs may change, and reducing the accuracy performance of the channel estimation. Therefore, the embodiments of the present application can provide the higher channel estimation accuracy performance.

As shown in FIG. 4, ports 0 to 7, ports 8 to 15 and ports 16 to 23 share the same time-frequency resources respectively, and different DMRS orthogonal ports are implemented in the FDM way among the ports 0 to 7, ports 8 to 15 and ports 16 to 23. The CS represents the code-domain CS for the ZC sequence.

Ports 0 to 7 share the same time-frequency resources, occupy REs #0, 3, 6 and 9 in a PRB in the frequency domain, and occupy 2 OFDM symbols in the time domain, and different DMRS orthogonal ports are further implemented through CS values of a ZC sequence of which the number is 4 and a TD-OCC sequence with the sequence length of 2;
Port 0: CS value 0 of ZC sequence+TD-OCC sequence {1, 1};
Port 1: CS value 3 of ZC sequence+TD-OCC sequence {1, 1};
Port 2: CS value 6 of ZC sequence+TD-OCC sequence {1, 1};
Port 3: CS value 9 of ZC sequence+TD-OCC sequence {1, 1};
Port 4: CS value 0 of ZC sequence+TD-OCC sequence {1, −1};
Port 5: CS value 3 of ZC sequence+TD-OCC sequence {1, −1};
Port 6: CS value 6 of the ZC sequence+TD-OCC sequence {1, −1};
Port 7: CS value 9 of ZC sequence+TD-OCC sequence {1, −1}.

Ports 8 to 15 share the same time-frequency resources, occupy REs #1, 4, 7 and 10 in a PRB in the frequency domain, and occupy 2 OFDM symbols in the time domain, and different DMRS orthogonal ports are further implemented through CS values of a ZC sequence of which the number is 4 and a TD-OCC sequence with the sequence length of 2;
Port 8: CS value 0 of ZC sequence+TD-OCC sequence {1, 1};
Port 9: CS value 3 of ZC sequence+TD-OCC sequence {1, 1};
Port 10: CS value 6 of ZC sequence+TD-OCC sequence {1, 1};
Port 11: CS value 9 of ZC sequence+TD-OCC sequence {1, 1};
Port 12: CS value 0 of ZC sequence+TD-OCC sequence {1, −1};
Port 13: CS value 3 of ZC sequence+TD-OCC sequence {1, −1};
Port 14: CS value 6 of ZC sequence+TD-OCC sequence {1, −1};
Port 15: CS value 9 of ZC sequence+TD-OCC sequence {1, −1}.

Ports 16 to 23 share the same time-frequency resources, occupy REs #2, 5, 8 and 11 in a PRB in the frequency domain, and occupy 2 OFDM symbols in the time domain, and different DMRS orthogonal ports are further implemented through CS values of a ZC sequence of which the number is 4 and a TD-OCC sequence with the sequence length of 2;
Port 16: CS value 0 of ZC sequence+TD-OCC sequence {1, 1};
Port 17: CS value 3 of ZC sequence+TD-OCC sequence {1, 1};
Port 18: CS value 6 of ZC sequence+TD-OCC sequence {1, 1};

Port 19: CS value 9 of ZC sequence+TD-OCC sequence {1, 1};
Port 20: CS value 0 of ZC sequence+TD-OCC sequence {1, −1};
Port 21: CS value 3 of ZC sequence+TD-OCC sequence {1, −1};
Port 22: CS value 6 of ZC sequence+TD-OCC sequence {1, −1};
Port 23: CS value 9 of ZC sequence+TD-OCC sequence {1, −1}.

Fourth Embodiment

Figure 6:
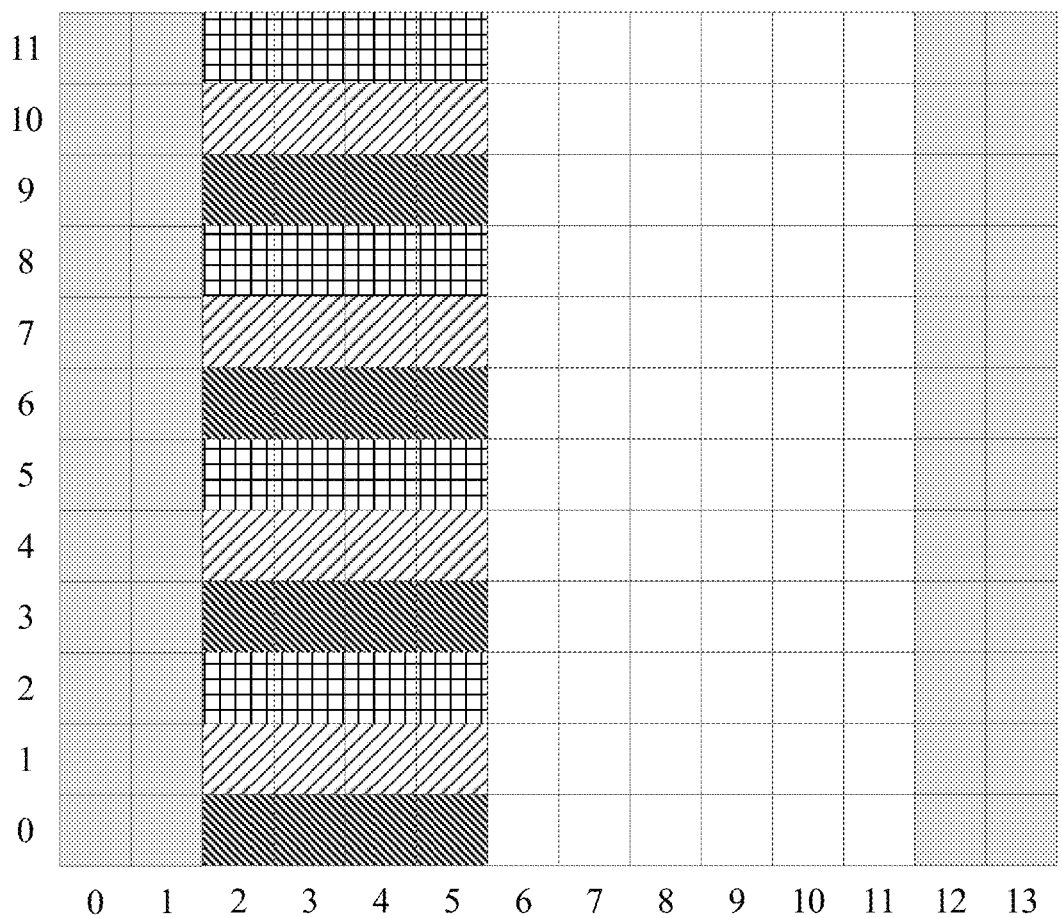
FIG. 6 is a schematic diagram of the configuration type 1 that supports 48 DMRS orthogonal ports under the DFT-s-OFDM waveform provided by an embodiment of the present application (4 OFDM symbols)

As shown in FIG. 6, the maximum number P of DMRS orthogonal ports under the DFT-s-OFDM waveform that can be supported by the embodiment of the present application is 48. 4 OFDM symbols are occupied in the time domain, the FDM factor in the frequency domain is 3, the number of code-domain CSs of the ZC sequence is 4, and the length of the TD-OCC sequence is 4.

The advantages of the embodiment of the present application are the same as those of the third embodiment, and the difference is increasing the length of the TD-OCC sequence to support a larger number of DMRS orthogonal ports at the cost of increasing the overhead of the time-domain OFDM symbols.

As shown in FIG. 6, ports 0 to 15, ports 16 to 31 and ports 32 to 47 share the same time-frequency resources respectively, and different DMRS orthogonal ports are implemented in the FDM way among the ports 0 to 15, ports 16 to 31 and ports 32 to 47. The CS represents the code-domain cyclic shift for the ZC sequence.

Ports 0 to 15 share the same time-frequency resources, occupy REs #0, 3, 6 and 9 in a PRB in the frequency domain, and occupy 4 OFDM symbols in the time domain, and different DMRS orthogonal ports are further implemented through CS values of a ZC sequence of which the number is 4 and a TD-OCC sequence with the sequence length of 4;
Port 0: CS value 0 of ZC sequence+TD-OCC sequence {1, 1, 1, 1};
Port 1: CS value 3 of ZC sequence+TD-OCC sequence {1, 1, 1, 1};
Port 2: CS value 6 of ZC sequence+TD-OCC sequence {1, 1, 1, 1};
Port 3: CS value 9 of ZC sequence+TD-OCC sequence {1, 1, 1, 1};
Port 4: CS value 0 of ZC sequence+TD-OCC sequence {1, 1, −1, −1};
Port 5: CS value 3 of ZC sequence+TD-OCC sequence {1, 1, −1, −1};
Port 6: CS value 6 of ZC sequence+TD-OCC sequence {1, 1, −1, −1};
Port 7: CS value 9 of ZC sequence+TD-OCC sequence {1, 1, −1, −1};
Port 8: CS value 0 of ZC sequence+TD-OCC sequence {1, −1, −1, 1};
Port 9: CS value 3 of ZC sequence+TD-OCC sequence {1, −1, −1, 1};
Port 10: CS value 6 of ZC sequence+TD-OCC sequence {1, −1, −1, 1};
Port 11: CS value 9 of ZC sequence+TD-OCC sequence {1, −1, −1, 1};
Port 12: CS value 0 of ZC sequence+TD-OCC sequence {1, −1, 1, −1};
Port 13: CS value 3 of ZC sequence+TD-OCC sequence {1, −1, 1, −1};
Port 14: CS value 6 of ZC sequence+TD-OCC sequence {1, −1, 1, −1};
Port 15: CS value 9 of ZC sequence+TD-OCC sequence {1, −1, 1, −1}.

Ports 16 to 31 share the same time-frequency resources, occupy REs #1, 4, 7 and 10 in a PRB in the frequency domain, and occupy 4 OFDM symbols in the time domain, and different DMRS orthogonal ports are further implemented through CS values of a ZC sequence of which the number is 4 and a TD-OCC sequence with the sequence length of 4;
Port 16: CS value 0 of ZC sequence+TD-OCC sequence {1, 1, 1, 1};
Port 17: CS value 3 of ZC sequence+TD-OCC sequence {1, 1, 1, 1};
Port 18: CS value 6 of ZC sequence+TD-OCC sequence {1, 1, 1, 1};
Port 19: CS value 9 of ZC sequence+TD-OCC sequence {1, 1, 1, 1};
Port 20: CS value 0 of ZC sequence+TD-OCC sequence {1, 1, −1, −1};
Port 21: CS value 3 of ZC sequence+TD-OCC sequence {1, 1, −1, −1};
Port 22: CS value 6 of ZC sequence+TD-OCC sequence {1, 1, −1, −1};
Port 23: CS value 9 of ZC sequence+TD-OCC sequence {1, 1, −1, −1};
Port 24: CS value 0 of ZC sequence+TD-OCC sequence {1, −1, −1, 1};
Port 25: CS value 3 of ZC sequence+TD-OCC sequence {1, −1, −1, 1};
Port 26: CS value 6 of ZC sequence+TD-OCC sequence {1, −1, −1, 1};
Port 27: CS value 9 of ZC sequence+TD-OCC sequence {1, −1, −1, 1};
Port 28: CS value 0 of ZC sequence+TD-OCC sequence {1, −1, 1, −1};
Port 29: CS value 3 of ZC sequence+TD-OCC sequence {1, −1, 1, −1};
Port 30: CS value 6 of ZC sequence+TD-OCC sequence {1, −1, 1, −1};
Port 31: CS value 9 of ZC sequence+TD-OCC sequence {1, −1, 1, −1}.

Ports 32 to 47 share the same time-frequency resources, occupy REs #2, 5, 8 and 11 in a PRB in the frequency domain, and occupy 4 OFDM symbols in the time domain, and different DMRS orthogonal ports are further implemented through CS values of a ZC sequence of which the number is 4 and a TD-OCC sequence with the sequence length of 4;
Port 32: CS value 0 of ZC sequence+TD-OCC sequence {1, 1, 1, 1};
Port 33: CS value 3 of ZC sequence+TD-OCC sequence {1, 1, 1, 1};
Port 34: CS value 6 of ZC sequence+TD-OCC sequence {1, 1, 1, 1};
Port 35: CS value 9 of ZC sequence+TD-OCC sequence {1, 1, 1, 1};
Port 36: CS value 0 of ZC sequence+TD-OCC sequence {1, 1, −1, −1};
Port 37: CS value 3 of ZC sequence+TD-OCC sequence {1, 1, −1, −1};
Port 38: CS value 6 of ZC sequence+TD-OCC sequence {1, 1, −1, −1};
Port 39: CS value 9 of ZC sequence+TD-OCC sequence {1, 1, −1, −1};

Port 40: CS value 0 of ZC sequence+TD-OCC sequence {1, −1, −1, 1};
Port 41: CS value 3 of ZC sequence+TD-OCC sequence {1, −1, −1, 1};
Port 42: CS value 6 of ZC sequence+TD-OCC sequence {1, −1, −1, 1};
Port 43: CS value 9 of ZC sequence+TD-OCC sequence {1, −1, −1, 1};
Port 44: CS value 0 of ZC sequence+TD-OCC sequence {1, −1, 1, −1};
Port 45: CS value 3 of ZC sequence+TD-OCC sequence {1, −1, 1, −1};
Port 46: CS value 6 of ZC sequence+TD-OCC sequence {1, −1, 1, −1};
Port 47: CS value 9 of ZC sequence+TD-OCC sequence {1, −1, 1, −1}.

Figure 7:
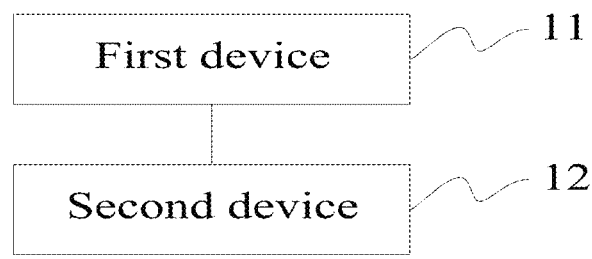
FIG. 7 is a structural schematic diagram of a data transmission device provided by an embodiment of the present application.

Corresponding to the foregoing method, as shown in FIG. 7, a data transmission device provided in an embodiment of the present application includes:
a first device 11 configured to determine a DMRS orthogonal port pattern of an uplink data channel, and the number of DMRS orthogonal ports is greater than 12;
a second device 12 configured to use the DMRS orthogonal port pattern for data transmission.

In one embodiment, different DMRS orthogonal ports are implemented at orthogonal frequency-domain positions based on a given frequency division multiplexing factor in the DMRS orthogonal port pattern.

In one embodiment, for a CP-OFDM waveform, different DMRS orthogonal ports are further implemented through orthogonal FD-OCC sequences.

In one embodiment, for a DFT-s-OFDM waveform, different DMRS orthogonal ports are further implemented through cyclic shift of a ZC sequence.

In one embodiment, different DMRS orthogonal ports are further implemented through orthogonal TD-OCC sequences.

It should be noted that the division of devices in the embodiments of the present application is illustrative, and is merely a kind of logical function division, and there may be other division methods in actual implementations. In addition, the functional devices in each embodiment of the present application may be integrated into one processing device, or each device may exist alone physically, or two or more devices may be integrated into one device. The above-mentioned integrated devices can be implemented in the form of hardware, or can be implemented in the form of software functional devices.

Here, when the integrated device is implemented in the form of software functional device and sold or used as an independent product, it may be stored in a computer readable storage medium. Based on such understanding, the embodiments of the present application essentially or a part that contributes to the prior art or all or a part of the solution may be embodied in the form of software product. The computer software product is stored in a storage medium, and includes several instructions used to enable a computer device (which may be a personal computer, server, or network device, etc.) or a processor to perform all or some of the steps of the methods in various embodiments of the present application. The above-mentioned storage medium includes: USB flash drive, mobile hard disk, Read-Only Memory (ROM), Random Access Memory (RAM), magnetic disk or compact disc or various media that can store the program codes.

Figure 8:
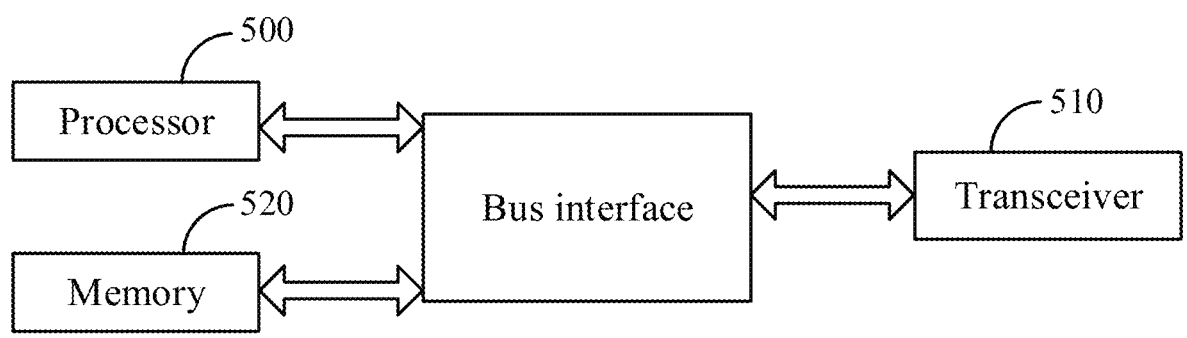
FIG. 8 is a structural schematic diagram of another data transmission device provided by an embodiment of the present application.

As shown in FIG. 8, another data transmission device provided by an embodiment of the present application includes:
a memory 520 configured to store program instructions;
a processor 500 configured to invoke the program instructions stored in the memory, and in accordance with the obtained program, perform the process of:
determining a DMRS orthogonal port pattern of an uplink data channel, and the number of DMRS orthogonal ports is greater than 12;
using the DMRS orthogonal port pattern for data transmission.

In one embodiment, the data transmission may be performed through a transceiver 510.

In one embodiment, different DMRS orthogonal ports are implemented at orthogonal frequency-domain positions based on a given frequency division multiplexing factor in the DMRS orthogonal port pattern.

In one embodiment, for a CP-OFDM waveform, different DMRS orthogonal ports are further implemented through orthogonal FD-OCC sequences.

In one embodiment, for a DFT-s-OFDM waveform, different DMRS orthogonal ports are further implemented through cyclic shift of a ZC sequence.

In one embodiment, different DMRS orthogonal ports are further implemented through orthogonal TD-OCC sequences.

In one embodiment, for a CP-OFDM waveform, in the DMRS orthogonal port pattern, the number of DMRS orthogonal ports is P, a Frequency Division Multiplexing (FDM) factor in the frequency domain is N, the length of an FD-OCC sequence is T, the length of a TD-OCC sequence is S, and P=N*T*S, and P is an integer value greater than 12, and N, T and S are integer values greater than or equal to 1.

In one embodiment, for the CP-OFDM waveform, in the DMRS orthogonal port pattern, the number of DMRS orthogonal ports is 24, the DMRS orthogonal ports occupy 2 OFDM symbols in the time domain, the FDM factor in the frequency domain is 3, the length of the FD-OCC sequence is 4, the length of the TD-OCC sequence is 2.

In one embodiment, among 24 DMRS orthogonal ports, ports 0 to 7, ports 8 to 15 and ports 16 to 23 share same time-frequency resources respectively, and different DMRS orthogonal ports are implemented in an FDM way among the ports 0 to 7, ports 8 to 15 and ports 16 to 23; and:
the ports 0 to 7 share same time-frequency resources, occupy REs #0, 1, 2 and 3 in a PRB in the frequency domain, and occupy 2 OFDM symbols in the time domain, and different DMRS orthogonal ports are further implemented through an FD-OCC sequence with the sequence length of 4 and a TD-OCC sequence with the sequence length of 2;
the ports 8 to 15 share same time-frequency resources, occupy REs #4, 5, 6 and 7 in a PRB in the frequency domain, and occupy 2 OFDM symbols in the time domain, and different DMRS orthogonal ports are further implemented through an FD-OCC sequence with the sequence length of 4 and a TD-OCC sequence with the sequence length of 2;
the ports 16 to 23 share same time-frequency resources, occupy REs #8, 9, 10 and 11 in a PRB in the frequency domain, and occupy 2 OFDM symbols in the time domain, and different DMRS orthogonal ports are further implemented through an FD-OCC sequence with the sequence length of 4 and a TD-OCC sequence with the sequence length of 2.

In one embodiment, for the CP-OFDM waveform, in the DMRS orthogonal port pattern, the number of DMRS orthogonal ports is 48, the DMRS orthogonal ports occupy 4 OFDM symbols in the time domain, the FDM factor in the frequency domain is 3, the length of the FD-OCC sequence is 4, the length of the TD-OCC sequence is 4.

In one embodiment, among 48 DMRS orthogonal ports, ports 0 to 15, ports 16 to 31 and ports 32 to 47 share same time-frequency resources respectively, and different DMRS orthogonal ports are implemented in an FDM way among the ports 0 to 15, ports 16 to 31 and ports 32 to 47; and:

the ports 0 to 15 share same time-frequency resources, occupy REs #0, 1, 2 and 3 in a PRB in the frequency domain, and occupy 4 OFDM symbols in the time domain, and different DMRS orthogonal ports are further implemented through an FD-OCC sequence with the sequence length of 4 and a TD-OCC sequence with the sequence length of 4;

the ports 16 to 31 share same time-frequency resources, occupy REs #4, 5, 6 and 7 in a PRB in the frequency domain, and occupy 4 OFDM symbols in the time domain, and different DMRS orthogonal ports are further implemented through an FD-OCC sequence with the sequence length of 4 and a TD-OCC sequence with the sequence length of 4;

the ports 32 to 47 share same time-frequency resources, occupy REs #8, 9, 10 and 11 in a PRB in the frequency domain, and occupy 4 OFDM symbols in the time domain, and different DMRS orthogonal ports are further implemented through an FD-OCC sequence with the sequence length of 4 and a TD-OCC sequence with the sequence length of 4.

In one embodiment, for the DFT-s-OFDM waveform, in the DMRS orthogonal port pattern, the number of DMRS orthogonal ports is P, the DMRS orthogonal ports occupy M OFDM symbols in the time domain, the FDM factor in the frequency domain is N, the number of code-domain CSs of a ZC sequence is R, the length of a TD-OCC sequence is S, and P=N*R*S, and P is an integer value greater than 12, and N, R and S are integer values greater than or equal to 1.

In one embodiment, for the DFT-s-OFDM waveform, in the DMRS orthogonal port pattern, the number of DMRS orthogonal ports is 24, the DMRS orthogonal ports occupy 2 OFDM symbols in the time domain, the FDM factor in the frequency domain is 3, the number of code-domain CSs of the ZC sequence is 4, and the length of the TD-OCC sequence is 2.

In one embodiment, among 24 DMRS orthogonal ports, ports 0 to 7, ports 8 to 15 and ports 16 to 23 share same time-frequency resources respectively, and different DMRS orthogonal ports are implemented in an FDM way among the ports 0 to 7, ports 8 to 15 and ports 16 to 23; and:

the ports 0 to 7 share same time-frequency resources, occupy REs #0, 3, 6 and 9 in a PRB in the frequency domain, and occupy 2 OFDM symbols in the time domain, and different DMRS orthogonal ports are further implemented through CS values of a ZC sequence of which the number is 4 and a TD-OCC sequence with the sequence length of 2;

the ports 8 to 15 share same time-frequency resources, occupy REs #1, 4, 7 and 10 in a PRB in the frequency domain, and occupy 2 OFDM symbols in the time domain, and different DMRS orthogonal ports are further implemented through CS values of a ZC sequence of which the number is 4 and a TD-OCC sequence with the sequence length of 2;

the ports 16 to 23 share same time-frequency resources, occupy REs #2, 5, 8 and 11 in a PRB in the frequency domain, and occupy 2 OFDM symbols in the time domain, and different DMRS orthogonal ports are further implemented through CS values of a ZC sequence of which the number is 4 and a TD-OCC sequence with the sequence length of 2.

In one embodiment, for the DFT-s-OFDM waveform, in the DMRS orthogonal port pattern, the number of DMRS orthogonal ports is 48, the DMRS orthogonal ports occupy 4 OFDM symbols in the time domain, the FDM factor in the frequency domain is 3, the number of code-domain CSs of the ZC sequence is 4, and the length of the TD-OCC sequence is 4.

In one embodiment, among 48 DMRS orthogonal ports, ports 0 to 15, ports 16 to 31 and ports 32 to 47 share same time-frequency resources respectively, and different DMRS orthogonal ports are implemented in an FDM way among the ports 0 to 15, ports 16 to 31 and ports 32 to 47; and:

the ports 0 to 15 share same time-frequency resources, occupy REs #0, 3, 6 and 9 in a PRB in the frequency domain, and occupy 4 OFDM symbols in the time domain, and different DMRS orthogonal ports are further implemented through CS values of a ZC sequence of which the number is 4 and a TD-OCC sequence with the sequence length of 4;

the ports 16 to 31 share same time-frequency resources, occupy REs #1, 4, 7 and 10 in a PRB in the frequency domain, and occupy 4 OFDM symbols in the time domain, and different DMRS orthogonal ports are further implemented through CS values of a ZC sequence of which the number is 4 and a TD-OCC sequence with the sequence length of 4;

the ports 32 to 47 share same time-frequency resources, occupy REs #2, 5, 8 and 11 in a PRB in the frequency domain, and occupy 4 OFDM symbols in the time domain, and different DMRS orthogonal ports are further implemented through CS values of a ZC sequence of which the number is 4 and a TD-OCC sequence with the sequence length of 4.

In one embodiment, the transceiver 510 is configured to receive and send the data under the control of the processor 500.

Here, in FIG. 8, the bus architecture may include any numbers of interconnected buses and bridges, and specifically link various circuits of one or more processors represented by the processor 500 and the memory represented by the memory 520. The bus architecture may further link various other circuits such as peripheral device, voltage regulator and power management circuit, which are all well known in the art and thus will not be further described again herein. The bus interface provides an interface. The transceiver 510 may be elements, i.e., include a transmitter and a receiver, and provide the devices for communicating with various other devices over the transmission media. The processor 500 is responsible for managing the bus architecture and general processing, and the memory 520 may store the data used by the processor 500 when performing the operations.

The processor 500 may be Central Processing Device (CPU), Application Specific Integrated Circuit (ASIC), Field-Programmable Gate Array (FPGA) or Complex Programmable Logic Device (CPLD).

The data transmission device provided by the embodiment of the present application may be a user terminal or a network side device, such as a base station. When it is used as a user terminal, it may also have related devices such as a user interface. For different user equipments, the user interface can also be the interface capable of inter-connecting or exter-connecting with the required devices, and the connected devices include but not limited to keypad, display, loudspeaker, microphone, joystick and the like. In addition, there may be other devices, which will not be repeated here.

An embodiment of the present application further provides a computing device, which can specifically be a desktop computer, a portable computer, a smart phone, a tablet computer, a Personal Digital Assistant (PDA) or the like. The computing device can include a Center Processing Device (CPU), a memory, input/output devices and the like. The input device can include a keyboard, a mouse, a touch screen and the like, and the output device can include a display device such as Liquid Crystal Display (LCD), Cathode Ray Tube (CRT) or the like.

The memory can include a Read-Only Memory (ROM) and a Random Access Memory (RAM), and provide the program instructions and data stored in the memory to the processor. In an embodiment of the present application, the memory may be used to store the program of any method provided by the embodiments of the present application.

The processor invokes the program instructions stored in the memory and is configured to perform any method provided by the embodiments of the present application in accordance with the obtained program instructions.

An embodiment of the present application provides a computer storage medium for storing the computer program instructions used by the apparatuses provided by the embodiments of the present application described above, where the computer storage medium contains the program for performing any one of the methods provided by the embodiments of the present application described above.

The computer storage medium may be any available media or data storage device accessible to the computer, including but not limited to magnetic memory (e.g., floppy disk, hard disk, magnetic tape, Magnetic Optical disc (MO) or the like), optical memory (e.g., CD, DVD, BD, HVD or the like), semiconductor memory (e.g., ROM, EPROM, EEPROM, nonvolatile memory (NAND FLASH), Solid State Disk (SSD)) or the like.

The methods provided by the embodiments of the present application may be applied to the terminal devices, and may also be applied to the network devices.

Here, the terminal device can also referred to as the User Equipment ("UE" for short), Mobile Station ("MS" for short), Mobile Terminal ("MT" for short) or the like. In one embodiment, the terminal can has the ability of communicating with one or more core networks via the Radio Access Network (RAN). For example, the terminal can be a mobile telephone (or called "cellular" telephone), or a computer with the mobile property. For example, the terminal can also be a portable, pocket, handheld, computer built-in or vehicle-carried mobile device.

The network device may be a base station (e.g., access point), which means the device in the access network communicating with the wireless terminal via one or more sectors over the air interface. The base station may be used to perform the inter-conversion between the received air frame and the IP packet, and used as the router between the wireless terminal and the rest of the access network, and the rest of the access network may include Internet Protocol (IP) networks. The base station may further coordinate the attribute management of the air interface. For example, the base station can be the BTS in the GSM or CDMA, or can be the NodeB in the WCDMA, or can be the NodeB or eNB or e-NodeB (evolutional Node B) in the LTE, or can be the gNB in the 5G system, or the like. which is not limited in the embodiments of the present application.

The processing flows of the above methods may be implemented by a software program, which may be stored in a storage medium. When the stored software program is invoked, the above method steps are performed.

In summary, the embodiments of the present application solve the pattern design method of DMRS orthogonal ports when the number of DeModulation Reference Signal (DMRS) orthogonal ports of the uplink data channel is 24 or 48, to better support the non-orthogonal multiple access transmission in the uplink scheduling-free scenario. The embodiments of the present application can effectively satisfy the UE activation detection, channel estimation and data channel detection performance in the NOMA uplink scheduling-free scenario, and better supporting the non-orthogonal multiple access transmission in the uplink scheduling-free scenario.

The embodiments of the present application can provide methods, systems and computer program products. Thus the present application can take the form of hardware embodiments alone, software embodiments alone, or embodiments combining the software and hardware aspects. Also the present application can take the form of computer program products implemented on one or more computer usable storage mediums (including but not limited to magnetic disk memories, optical memories and the like) containing computer usable program codes therein.

The present application is described by reference to the flow charts and/or the block diagrams of the methods, the devices (systems) and the computer program products according to the embodiments of the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which guides the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

What is claimed is:

1. A data transmission method, comprising:
   determining a DeModulation Reference Signal, DMRS, orthogonal port pattern of an uplink data channel, wherein a quantity of DMRS orthogonal ports is greater than 12;
   using the DMRS orthogonal port pattern for data transmission;
   wherein different DMRS orthogonal ports are implemented at orthogonal frequency-domain positions based on a frequency division multiplexing factor in the DMRS orthogonal port pattern;
   wherein for a Cyclic Prefix-Orthogonal Frequency Division Multiplex, CP-OFDM, waveform, different DMRS orthogonal ports are implemented through orthogonal Frequency Domain-Orthogonal Cover Code, FD-OCC, sequences, or for a Discrete Fourier Transform-Spread-OFDM, DFT-s-OFDM, waveform, different DMRS orthogonal ports are implemented through cyclic shifts of a Zadoff-Chu, ZC sequence;
   wherein different DMRS orthogonal ports are further implemented through orthogonal Time Domain-OCC, TD-OCC sequences;
   wherein for the CP-OFDM waveform, in the DMRS orthogonal port pattern, the quantity of DMRS orthogonal ports is P, a Frequency Division Multiplexing, FDM, factor in the frequency domain is N, a length of an FD-OCC sequence is T, a length of a TD-OCC sequence is S, and P=N*T*S, wherein P is an integer value greater than 12, and N, T and S are integer values greater than or equal to 1;
   for the CP-OFDM waveform, in the DMRS orthogonal port pattern, the quantity P of DMRS orthogonal ports is 24 or 48, the FDM factor N in the frequency domain is 3, the length T of the FD-OCC sequence is 4, the length S of the TD-OCC sequence is 2 or 4;
   wherein for the DFT-s-OFDM waveform, in the DMRS orthogonal port pattern, the quantity of DMRS orthogonal ports is P, a Frequency Division Multiplexing, FDM, factor in the frequency domain is N, a quantity of code-domain Cyclic Shifts, CSs, of a ZC sequence is R, a length of a TD-OCC sequence is S, and P=N*R*S, wherein P is an integer value greater than 12, and N, R and S are integer values greater than or equal to 1;
   for the DFT-s-OFDM waveform, in the DMRS orthogonal port pattern, the quantity P of DMRS orthogonal ports is 24 or 48, the FDM factor N in the frequency domain is 3, the quantity R of code-domain CSs of the ZC sequence is 4, and the length S of the TD-OCC sequence is 2 or 4;
   wherein among 24 DMRS orthogonal ports, ports 0 to 7, ports 8 to 15 and ports 16 to 23 share same time-frequency resources respectively, and different DMRS orthogonal ports are implemented in an FDM way among the ports 0 to 7, ports 8 to 15 and ports 16 to 23;
   wherein among 48 DMRS orthogonal ports, ports 0 to 15, ports 16 to 31 and ports 32 to 47 share same time-frequency resources respectively, and different DMRS orthogonal ports are implemented in an FDM way among the ports 0 to 15, ports 16 to 31 and ports 32 to 47.

2. The method according to claim 1, wherein for the CP-OFDM waveform,
   among the 24 DMRS orthogonal ports,
   the ports 0 to 7 share same time-frequency resources, occupy Resource Elements, REs, #0, 1, 2 and 3 in a Physical Resource Block, PRB, in the frequency domain, and occupy 2 OFDM symbols in the time domain, and different DMRS orthogonal ports are further implemented through an FD-OCC sequence with a sequence length of 4 and a TD-OCC sequence with a sequence length of 2;
   the ports 8 to 15 share same time-frequency resources, occupy REs #4, 5, 6 and 7 in a PRB in the frequency domain, and occupy 2 OFDM symbols in the time domain, and different DMRS orthogonal ports are further implemented through an FD-OCC sequence with a sequence length of 4 and a TD-OCC sequence with a sequence length of 2;
   the ports 16 to 23 share same time-frequency resources, occupy REs #8, 9, 10 and 11 in a PRB in the frequency domain, and occupy 2 OFDM symbols in the time domain, and different DMRS orthogonal ports are further implemented through an FD-OCC sequence with a sequence length of 4 and a TD-OCC sequence with a sequence length of 2.

3. The method according to claim 1, wherein for the CP-OFDM waveform,
   among the 48 DMRS orthogonal ports,
   the ports 0 to 15 share same time-frequency resources, occupy Resource Elements, REs, #0, 1, 2 and 3 in a Physical Resource Block, PRB, in the frequency domain, and occupy 4 OFDM symbols in the time domain, and different DMRS orthogonal ports are further implemented through an FD-OCC sequence with a sequence length of 4 and a TD-OCC sequence with a sequence length of 4;
   the ports 16 to 31 share same time-frequency resources, occupy REs #4, 5, 6 and 7 in a PRB in the frequency domain, and occupy 4 OFDM symbols in the time domain, and different DMRS orthogonal ports are further implemented through an FD-OCC sequence with a sequence length of 4 and a TD-OCC sequence with a sequence length of 4;
   the ports 32 to 47 share same time-frequency resources, occupy REs #8, 9, 10 and 11 in a PRB in the frequency domain, and occupy 4 OFDM symbols in the time domain, and different DMRS orthogonal ports are further implemented through an FD-OCC sequence with a sequence length of 4 and a TD-OCC sequence with a sequence length of 4.

4. The method according to claim 1, wherein for the DFT-s-OFDM waveform,
   among 24 DMRS orthogonal ports,
   the ports 0 to 7 share same time-frequency resources, occupy Resource Elements, REs, #0, 3, 6 and 9 in a Physical Resource Block, PRB, in the frequency domain, and occupy 2 OFDM symbols in the time domain, and different DMRS orthogonal ports are further implemented through CS values of a ZC sequence of which the quantity is 4 and a TD-OCC sequence with a sequence length of 2;
   the ports 8 to 15 share same time-frequency resources, occupy REs #1, 4, 7 and 10 in a PRB in the frequency domain, and occupy 2 OFDM symbols in the time domain, and different DMRS orthogonal ports are further implemented through CS values of a ZC sequence of which the quantity is 4 and a TD-OCC sequence with a sequence length of 2;
   the ports 16 to 23 share same time-frequency resources, occupy REs #2, 5, 8 and 11 in a PRB in the frequency domain, and occupy 2 OFDM symbols in the time domain, and different DMRS orthogonal ports are further implemented through CS values of a ZC sequence of which the quantity is 4 and a TD-OCC sequence with a sequence length of 2.

5. The method according to claim 1, wherein for the DFT-s-OFDM waveform, among 48 DMRS orthogonal ports, the ports 0 to 15 share same time-frequency resources, occupy Resource Elements, REs, #0, 3, 6 and 9 in a Physical Resource Block, PRB, in the frequency domain, and occupy 4 OFDM symbols in the time domain, and different DMRS orthogonal ports are further implemented through CS values of a ZC sequence of which the quantity is 4 and a TD-OCC sequence with a sequence length of 4;

the ports 16 to 31 share same time-frequency resources, occupy REs #1, 4, 7 and 10 in a PRB in the frequency domain, and occupy 4 OFDM symbols in the time domain, and different DMRS orthogonal ports are further implemented through CS values of a ZC sequence of which the quantity is 4 and a TD-OCC sequence with a sequence length of 4;

the ports 32 to 47 share same time-frequency resources, occupy REs #2, 5, 8 and 11 in a PRB in the frequency domain, and occupy 4 OFDM symbols in the time domain, and different DMRS orthogonal ports are further implemented through CS values of a ZC sequence of which the quantity is 4 and a TD-OCC sequence with a sequence length of 4.

6. A data transmission device, comprising:

a memory configured to store program instructions;

a processor configured to invoke the program instructions stored in the memory, and in accordance with obtained program, perform a process of:

determining a DeModulation Reference Signal, DMRS, orthogonal port pattern of an uplink data channel, wherein a quantity of DMRS orthogonal ports is greater than 12;

using the DMRS orthogonal port pattern for data transmission;

wherein different DMRS orthogonal ports are implemented at orthogonal frequency-domain positions based on a frequency division multiplexing factor in the DMRS orthogonal port pattern;

wherein for a Cyclic Prefix-Orthogonal Frequency Division Multiplex, CP-OFDM, waveform, different DMRS orthogonal ports are implemented through orthogonal Frequency Domain-Orthogonal Cover Code, FD-OCC, sequences, or for a Discrete Fourier Transform-Spread-OFDM, DFT-s-OFDM, waveform, different DMRS orthogonal ports are implemented through cyclic shift of a Zadoff-Chu, ZC sequence;

wherein different DMRS orthogonal ports are further implemented through orthogonal Time Domain-OCC, TD-OCC sequences;

wherein for the CP-OFDM waveform, in the DMRS orthogonal port pattern, the quantity of DMRS orthogonal ports is P, a Frequency Division Multiplexing, FDM, factor in the frequency domain is N, a length of an FD-OCC sequence is T, a length of a TD-OCC sequence is S, and P=N*T*S, wherein P is an integer value greater than 12, and N, T and S are integer values greater than or equal to 1;

for the CP-OFDM waveform, in the DMRS orthogonal port pattern, the quantity P of DMRS orthogonal ports is 24 or 48, the FDM factor N in the frequency domain is 3, the length T of the FD-OCC sequence is 4, the length S of the TD-OCC sequence is 2 or 4;

wherein for the DFT-s-OFDM waveform, in the DMRS orthogonal port pattern, the quantity of DMRS orthogonal ports is P, a Frequency Division Multiplexing, FDM, factor in the frequency domain is N, a quantity of code-domain Cyclic Shifts, CSs, of a ZC sequence is R, a length of a TD-OCC sequence is S, and P=N*R*S, wherein P is an integer value greater than 12, and N, R and S are integer values greater than or equal to 1;

for the DFT-s-OFDM waveform, in the DMRS orthogonal port pattern, the quantity P of DMRS orthogonal ports is 24 or 48, the FDM factor N in the frequency domain is 3, the quantity R of code-domain CSs of the ZC sequence is 4, and the length S of the TD-OCC sequence is 2 or 4;

wherein among 24 DMRS orthogonal ports, ports 0 to 7, ports 8 to 15 and ports 16 to 23 share same time-frequency resources respectively, and different DMRS orthogonal ports are implemented in an FDM way among the ports 0 to 7, ports 8 to 15 and ports 16 to 23;

wherein among 48 DMRS orthogonal ports, ports 0 to 15, ports 16 to 31 and ports 32 to 47 share same time-frequency resources respectively, and different DMRS orthogonal ports are implemented in an FDM way among the ports 0 to 15, ports 16 to 31 and ports 32 to 47.

7. The device according to claim 6, wherein for the CP-OFDM waveform, among 24 DMRS orthogonal ports, the ports 0 to 7 share same time-frequency resources, occupy Resource Elements, REs, #0, 1, 2 and 3 in a Physical Resource Block, PRB, in the frequency domain, and occupy 2 OFDM symbols in the time domain, and different DMRS orthogonal ports are further implemented through an FD-OCC sequence with a sequence length of 4 and a TD-OCC sequence with a sequence length of 2;

the ports 8 to 15 share same time-frequency resources, occupy REs #4, 5, 6 and 7 in a PRB in the frequency domain, and occupy 2 OFDM symbols in the time domain, and different DMRS orthogonal ports are further implemented through an FD-OCC sequence with a sequence length of 4 and a TD-OCC sequence with a sequence length of 2;

the ports 16 to 23 share same time-frequency resources, occupy REs #8, 9, 10 and 11 in a PRB in the frequency domain, and occupy 2 OFDM symbols in the time domain, and different DMRS orthogonal ports are further implemented through an FD-OCC sequence with a sequence length of 4 and a TD-OCC sequence with a sequence length of 2.

8. The device according to claim 6, wherein for the CP-OFDM waveform, among 48 DMRS orthogonal ports, the ports 0 to 15 share same time-frequency resources, occupy Resource Elements, REs, #0, 1, 2 and 3 in a Physical Resource Block, PRB, in the frequency domain, and occupy 4 OFDM symbols in the time domain, and different DMRS orthogonal ports are further implemented through an FD-OCC sequence with a sequence length of 4 and a TD-OCC sequence with a sequence length of 4;

the ports 16 to 31 share same time-frequency resources, occupy REs #4, 5, 6 and 7 in a PRB in the frequency domain, and occupy 4 OFDM symbols in the time domain, and different DMRS orthogonal ports are further implemented through an FD-OCC sequence with a sequence length of 4 and a TD-OCC sequence with a sequence length of 4;

the ports 32 to 47 share same time-frequency resources, occupy REs #8, 9, 10 and 11 in a PRB in the frequency domain, and occupy 4 OFDM symbols in the time domain, and different DMRS orthogonal ports are further implemented through an FD-OCC sequence with a sequence length of 4 and a TD-OCC sequence with a sequence length of 4.

9. The device according to claim 6, wherein for the DFT-s-OFDM waveform, among 24 DMRS orthogonal ports, the ports 0 to 7 share same time-frequency resources, occupy Resource Elements, REs, #0, 3, 6 and 9 in a Physical Resource Block, PRB, in the frequency domain, and occupy 2 OFDM symbols in the time domain, and different DMRS orthogonal ports are further implemented through CS values of a ZC sequence of which the quantity is 4 and a TD-OCC sequence with a sequence length of 2;

the ports 8 to 15 share same time-frequency resources, occupy REs #1, 4, 7 and 10 in a PRB in the frequency domain, and occupy 2 OFDM symbols in the time domain, and different DMRS orthogonal ports are further implemented through CS values of a ZC sequence of which the quantity is 4 and a TD-OCC sequence with a sequence length of 2;

the ports 16 to 23 share same time-frequency resources, occupy REs #2, 5, 8 and 11 in a PRB in the frequency domain, and occupy 2 OFDM symbols in the time domain, and different DMRS orthogonal ports are further implemented through CS values of a ZC sequence of which the quantity is 4 and a TD-OCC sequence with a sequence length of 2.

10. The device according to claim 6, wherein for the DFT-s-OFDM waveform, among 48 DMRS orthogonal ports, the ports 0 to 15 share same time-frequency resources, occupy Resource Elements, REs, #0, 3, 6 and 9 in a Physical Resource Block, PRB, in the frequency domain, and occupy 4 OFDM symbols in the time domain, and different DMRS orthogonal ports are further implemented through CS values of a ZC sequence of which the quantity is 4 and a TD-OCC sequence with a sequence length of 4;

the ports 16 to 31 share same time-frequency resources, occupy REs #1, 4, 7 and 10 in a PRB in the frequency domain, and occupy 4 OFDM symbols in the time domain, and different DMRS orthogonal ports are further implemented through CS values of a ZC sequence of which the quantity is 4 and a TD-OCC sequence with a sequence length of 4;

the ports 32 to 47 share same time-frequency resources, occupy REs #2, 5, 8 and 11 in a PRB in the frequency domain, and occupy 4 OFDM symbols in the time domain, and different DMRS orthogonal ports are further implemented through CS values of a ZC sequence of which the quantity is 4 and a TD-OCC sequence with a sequence length of 4.

\* \* \* \* \*